(12) United States Patent
Ragazzini et al.

(10) Patent No.: US 10,946,997 B2
(45) Date of Patent: Mar. 16, 2021

(54) DOSING METHOD AND FILLING MACHINE

(71) Applicant: I.M.A. INDUSTRIA MACCHINE AUTOMATICHE S.P.A., Ozzano dell'Emilia (IT)

(72) Inventors: Ivan Ragazzini, Ozzano dell'Emilia (IT); Gianluca Zauli, Ozzano dell'Emilia (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 416 days.

(21) Appl. No.: 15/999,815

(22) PCT Filed: Feb. 17, 2017

(86) PCT No.: PCT/IB2017/050915
§ 371 (c)(1),
(2) Date: Aug. 20, 2018

(87) PCT Pub. No.: WO2017/141206
PCT Pub. Date: Aug. 24, 2017

(65) Prior Publication Data
US 2020/0407096 A1 Dec. 31, 2020

(30) Foreign Application Priority Data
Feb. 19, 2016 (IT) .......................... 102016000017166

(51) Int. Cl.
*B65B 57/14* (2006.01)
*B65B 3/28* (2006.01)
(Continued)

(52) U.S. Cl.
CPC ............ *B65B 57/145* (2013.01); *B65B 3/003* (2013.01); *B65B 3/28* (2013.01); *G01G 17/06* (2013.01);
(Continued)

(58) Field of Classification Search
CPC ......... B65B 57/145; B65B 3/003; B65B 3/26; B65B 3/28; B65B 3/30; G01N 29/00; G01N 29/02; G01N 2291/02433; G01G 17/06
See application file for complete search history.

(56) References Cited

U.S. PATENT DOCUMENTS 6,021,921 A * 2/2000 Lan ..................... H01L 21/6715
222/61
7,343,943 B2 * 3/2008 Khan ..................... B65B 3/003
141/2
(Continued)

FOREIGN PATENT DOCUMENTS

CN 204016966 12/2014
DE 10 2014 200 250 7/2015
(Continued)

OTHER PUBLICATIONS

Japanese Office Action dated Aug. 20, 2019 in Japanese Patent Application No. 2018-543672 with Machine Translation.
(Continued)

*Primary Examiner* — Nicolas A Arnett
(74) *Attorney, Agent, or Firm* — Wenderoth, Lind & Ponack, L.L.P.

(57) ABSTRACT

A method for dosing a product in liquid form in containers includes transferring doses of product by a dosing unit from a feed tank, controlling through a bubble sensor the doses to the containers to detect the presence and volume of gas bubbles in each dose, delivering the doses inside the containers, measuring with a weight sensor a weight of the doses in the containers, and arranging a processing and control unit to receive and process a weight signal of the weight sensor and a bubbles signal from the bubble sensor. The processing and control unit is connected to the dosing unit to modify the pre-established quantity of product sup- (Continued)

plied for each dose as a function of the weight depending on whether the bubble sensor detects a volume of gas bubbles in the doses that is lower than a predefined reference value.

23 Claims, 3 Drawing Sheets

(51) Int. Cl.
    *G01G 17/06*     (2006.01)
    *G01N 29/02*     (2006.01)
    *B65B 3/00*     (2006.01)

(52) U.S. Cl.
    CPC ... *G01N 29/02* (2013.01); *G01N 2291/02433* (2013.01)

(56) References Cited

U.S. PATENT DOCUMENTS

| | | | | |
|---|---|---|---|---|
| 8,726,946 | B2 * | 5/2014 | Clusserath | B67C 3/10 141/6 |
| 9,751,748 | B2 * | 9/2017 | Trebbi | F04B 43/1261 |
| 10,188,849 | B2 * | 1/2019 | Fangrow | A61M 39/24 |
| 2002/0104370 | A1 | 8/2002 | Steger et al. | |
| 2010/0332158 | A1 * | 12/2010 | Courtial | G01F 11/284 702/55 |
| 2014/0096599 | A1 * | 4/2014 | Munch | G01F 1/74 73/61.79 |

FOREIGN PATENT DOCUMENTS

| | | |
|---|---|---|
| EP | 2 717 026 | 4/2014 |
| JP | 07-4303 | 1/1995 |
| JP | 08-285657 | 11/1996 |
| JP | 11-102056 | 4/1999 |
| WO | 2005/096776 | 10/2005 |

OTHER PUBLICATIONS

Chinese Office Action dated Dec. 4, 2019 in corresponding Chinese Patent Application No. 201780011611.8 with English translation.
International Search Report dated Jun. 12, 2017 in International (PCT) Application No. PCT/IB2017/050915.

\* cited by examiner

DOSING METHOD AND FILLING MACHINE

The present invention relates to methods and filling machines for dosing liquid products in containers and in particular it relates to a method and an automatic filling machine for dosing a pharmaceutical, cosmetic, food liquid product in containers as phials, bottles, ampoules, vials or alike.

In the filling machines employed to fill or dose containers with pharmaceutical products, in particular liquids, it is known the use of weighing devices, arranged downstream of a filling station of the machine, to measure the weight, in other words the quantity, of product dosed in the containers and thus check quality and performance of the filling process carried out by the dosing system.

Measuring the weight is in fact necessary in order to reject out-of-spec containers from production, for example because they contain a quantity of product out of the tolerance range of permitted dosage, and/or to correct possible excesses or scarcity in the dose of the product. In this last case, the measuring of weight is used in the feedback checking of the dosing system in order to correct the dosed quantity of product and then obtain anew compliant containers.

In the pharmaceutical field it is very important to verify that the weight of the dosed product in single containers is exactly the required one, with very restricted tolerance ranges.

Normally, an only weighing of the container is carried out at the end of the dosing, considering that the weight of the containers is known and included within a pre-established tolerance range, indicated and guaranteed by suppliers/producers of the containers. Thereby, by subtracting the known weight of the empty container (tare) from the weight of the filled container (gross weight), it is possible to calculate the weight of the dosed product (net weight) with a certain degree of accuracy.

In the filling processes wherein the quantity of product to be dosed is small, for example few milligrams, and the tolerance range required for the product dosing is limited, normal variations of weight of containers greatly affect the weight measure, consequently it is necessary to prior weight each container and calculate, by difference, the weight of the dosed product. The weighing systems comprise in this case a first weighing station, upstream of the filling station, which measures the weight of empty containers (tare), and a second weighing station, downstream of the filling station, which measures the weight of the filled containers (gross weight). The difference between the gross weight and the tare, measured and memorised for each container by a machine control unit, enables said control unit to calculate the net weight of the dosed product.

The weighing apparatuses of the weighing stations which perform such type of direct measure comprise electronic scales comprising measuring or load cells, on which containers must be positioned for a proper time lapse.

The measuring of the weight can be partial, of statistical type, that is carried out on a sample of containers randomly chosen, or of total type, that is carried out on all the containers filled in the packaging machine (so called 100% weight check).

However, in order to carry out an accurate and precise weighing by using electronic scales, it is required an adequate measuring time. In particular, between the positioning of the container on the scale and the measuring of the weight, a minimum time lapse must occur, necessary to enable the scale (load cell) to stabilize, that is to stop the vibrations which are generated when the container is positioned on the scale.

In the known filling machines it is possible to have a measuring time lapse that is adequately long (for a highly precise and accurate measure) and at the same time high productivity only by carrying out a statistical measuring of the weight of the containers, in other words a check carried out on a reduced sample thereof. However, for certain types of pharmaceutical productions, it is required to weight all the filled containers.

In the known filling machines with measuring of weight of total type it is possible to carry out a weighing of all the containers only by strongly reducing productivity or speed of the machine in order to have a measuring time to complete the weighing operation that is long enough to guarantee highly precise and accurate measure. As an alternative, it is possible to keep a high productivity or operating speed of the machine by measuring the weight of the containers with less precision and accuracy, since in this case the available measuring time does not allow scales to stabilize completely.

Accuracy and precision of the weight measure also depend on perturbations and interferences of different kinds acting on load cells of electronic scales, such interferences being hardly predictable and affecting the measuring also to a considerable extent. Perturbations comprise vibrations, accelerations due to mechanisms and moving parts of the machine and interferences caused by flows, currents and turbulences of the air within a filling machine workload.

Due to such perturbations and interferences, the precision and accuracy of the scales may be significantly altered, requiring the adoption, especially as regards small doses, of specific technical precautions in order to reduce such interferences, for example, the displacement of scales at a distance, or the use of reference load cells, specific measure-correcting algorithms, etc. However, these solutions are rather complicated and expensive.

One object of the present invention is improving the methods and the filling machines arranged for dosing a pharmaceutical, cosmetic, food liquid product in containers as phials, bottles, ampoules, vials or alike.

Another object is delivering a method and a filling machine which enable to check and maximize the filling process performances, in particular minimizing the number of filled containers to be rejected.

A further object is obtaining a method and a filling machine enabling to check in a precise and reliable way the doses of products delivered in the containers, without being influenced by interferences and perturbations caused by vibrations, accelerations, stresses, flows, currents and/or air turbulences created by mechanisms and/or operating means of the filling machine.

An additional further object is delivering a method and a filling machine enabling to detect in a precise and reliable way possible underdosed containers, that is containers containing a dose of product with a weight lower than the weight of a nominal dose of product.

A further object is still delivering a method and a filling machine able to carry out a weight check of total type, in other words carried out on all the filled containers, in a rapid and efficient way so as to check the quality and the performances of the executed filling process.

Another object is delivering a dosing system provided with devices for checking the doses of the product delivered in containers having extremely limited sizes and being cost-efficient.

In a first aspect of the invention, a method for dosing according to claim 1 is provided.

In a second aspect of the invention, a method for dosing according to claim 7 is provided.

In a third aspect of the invention a filling machine according to claim 13 is provided.

The invention shall be better understood and implemented by referring to the enclosed drawings showing a non-limiting exemplary embodiment, wherein:

With reference to FIGS. 1 and 2, it is schematically shown a dosing system 1 of a filling machine 50 according to the invention arranged to fill containers 100, as phials, bottles, ampoules, vials or similar with doses of product 20, in liquid form, for instance a pharmaceutical, cosmetic, or food product.

Figures 1, 2:
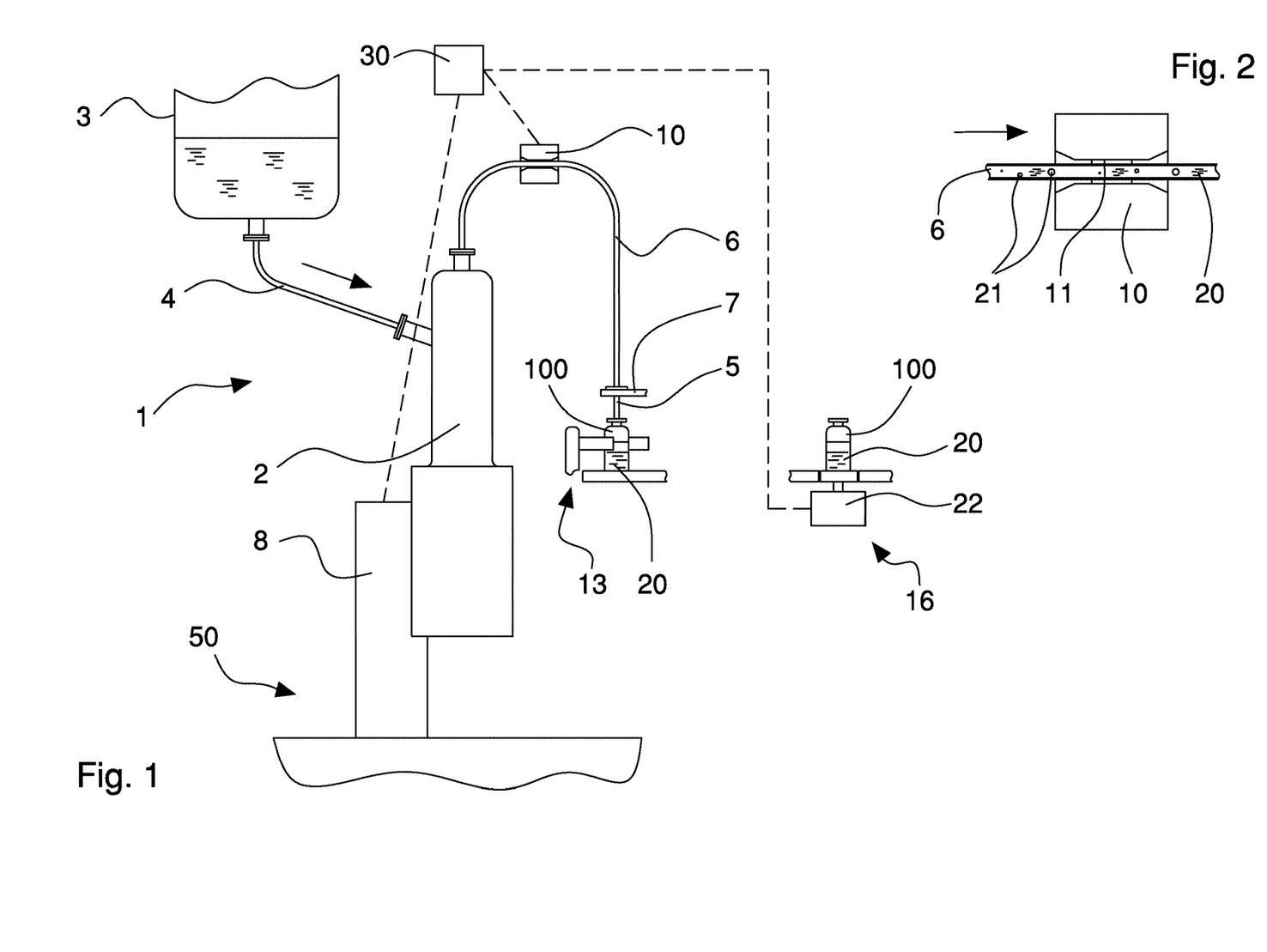
FIG. 1 is a schematic partial view of the filling machine according to the invention comprising a dosing system of the product in a container and a weighing station.
FIG. 2 is an enlarged and schematic view of a sensor of the dosing system of FIG. 1.

The dosing system 1 comprises at least a dosing unit 2 able to deliver a dose of product 20 in the containers 100, a feed tank 3 to feed with the product the dosing unit 2 by means of a first duct 4 and at least a delivery element 5 connected to the dosing unit 2 by means of a second duct 6 to deliver the doses of product 20 in the containers 100. Each dose of product 20 comprises a pre-established quantity of product supplied by the dosing unit 2.

The delivery element 5 includes a nozzle fixed to a supporting element 7 of the filling machine 50 and able to deliver the doses of product 20 in sequence in the containers 100, that are moved along the filling machine 50 by a transport system 13 thereof, of the prior art type and not shown in detail in the figures.

Furthermore, the dosing system 1 includes a bubble sensor 10 associated with the first duct 4 or with the second duct 6 and arranged to detect the presence of possible gas bubbles 21 in the doses of products 20 which flow in the ducts 4, 6 and measure a volume of said gas bubbles 21. Gas bubbles 21 may be air bubbles and/or bubbles of any gas, as for example nitrogen.

The ducts 4, 6 comprise respective flexible pipes made of plastic material, in particular of any one between PVC (polyvinylchloride), PTFE (polytetrafluoroethylene), PAEK (polyaryletherketones), PEEK (polyetheretherketone).

In the shown embodiment, the bubble sensor 10 is connected to the second duct 6, arranged between the dosing unit 2 and the delivery element 5, in order to check the doses of product 20 exiting from the dosing unit 2 and verify whether they contain inner bubbles, gas micro-bubbles, foam.

As an alternative, the bubble sensor 10 may be associated with the first duct 4, inserted between the feed tank 3 and the dosing unit 2.

The bubble sensor 10 includes an ultrasound sensor, of the known type and commercially available, for example an ultrasound sensor Sonocheck ABD made by SonotecUltraschallsensorik Halle GmbH, that is able to detect in a liquid the presence of gas bubbles 21 having a minimum volume as small as 0.3 μl and to carry out the detection process in a precise and accurate way in a time lapse between 200 ms and 1 ms.

The aforesaid ultrasound sensor 10 is further able to measure with accuracy and precision the volume of the single detected gas bubbles, having very small sizes too, until a minimum volume of 0.3 μl, so as to enable a processing and control unit 30 of the filling machine 50 to measure the volume of the gas bubbles 21 in each dose of product 20 and to calculate, on the basis of the volume of the gas bubbles 21 contained in a respective dose of product 20, an effective volume or quantity of product without gas bubbles 21 of the aforesaid dose of product 20.

Since the functioning of the bubble sensor 10 is based on the use of ultrasounds that detect the presence of gas bubbles in the liquid product flowing in a flexible plastic pipe, the aforesaid sensor is not at all influenced by the environmental conditions in the filling machine. More precisely, the accuracy and the precision both in the gas bubbles detection and in the measure of their volume are not at all altered by perturbations and interferences of different kinds in the filling machine and typically comprising vibrations, accelerations generated by the mechanisms and the moving parts of the machine and interferences caused by flows, currents and turbulences of the air produced by laminar air flow and/or by pneumatic means of operative stations of the machine. Furthermore, particular self-regulation precautions (such as closed loop control algorithms) may be provided and implemented in the checking system of the bubble sensor 10 in order to take into consideration environmental conditions such as the pressure of the product in the ducts 4, 6, ambient temperature, elasticity of the flexible pipes of the ducts 4, 6, humidity in correspondence of the flexible pipe and of the bubble sensor 10. These precautions ensure the correct detection and measure of the volume of the gas bubbles in the different environmental conditions.

As shown in FIG. 2, the bubble sensor 10 has particularly small sizes and comprises a seat 11 arranged to reversibly receive and block a portion of the flexible pipe of the second duct 6, in such a way as to check and analyse the doses of product 20 which flow in and through the pipe and, in particular, detect possible gas bubbles passing through the aforesaid portion. In general, the sizes of the seat 11 and of the bubble sensor 10 can be defined and selected as a function of the diameter of the flexible pipes of the ducts 4, 6 that is of the volume of the doses of product 20 to dose in each container 100.

The bubble sensor 10 can be implemented so that it is washable and/or sterilizable in the filling machine and/or suitable for use in sterile chambers or controlled-atmosphere environment.

The dosing system 1 of the invention may comprise a plurality of dosing units 2, each of which is associated with a respective bubble sensor 10. In this configuration, the sensors 10 are mounted on the second ducts 6 of the respective dosing units 2.

In the shown embodiment, the dosing unit 2 comprises a volumetric piston pump, of known type and not illustrated in detail, that withdraws the product out of the feed tank 3 and delivers defined doses, or volumes, of product 20 into the containers 100. The piston pump 2 is fixed, for example in a reversible way, to a supporting base 8 of the filling machine 50 which also contains the driving and movement means of the inner piston of the pump.

The dosing system 1 of the invention may comprise other types of dosing units of known type as, for example, volumetric rotary pumps, peristaltic pumps, flow meter dosing apparatuses, time/pressure dosing apparatuses.

Figure 3:
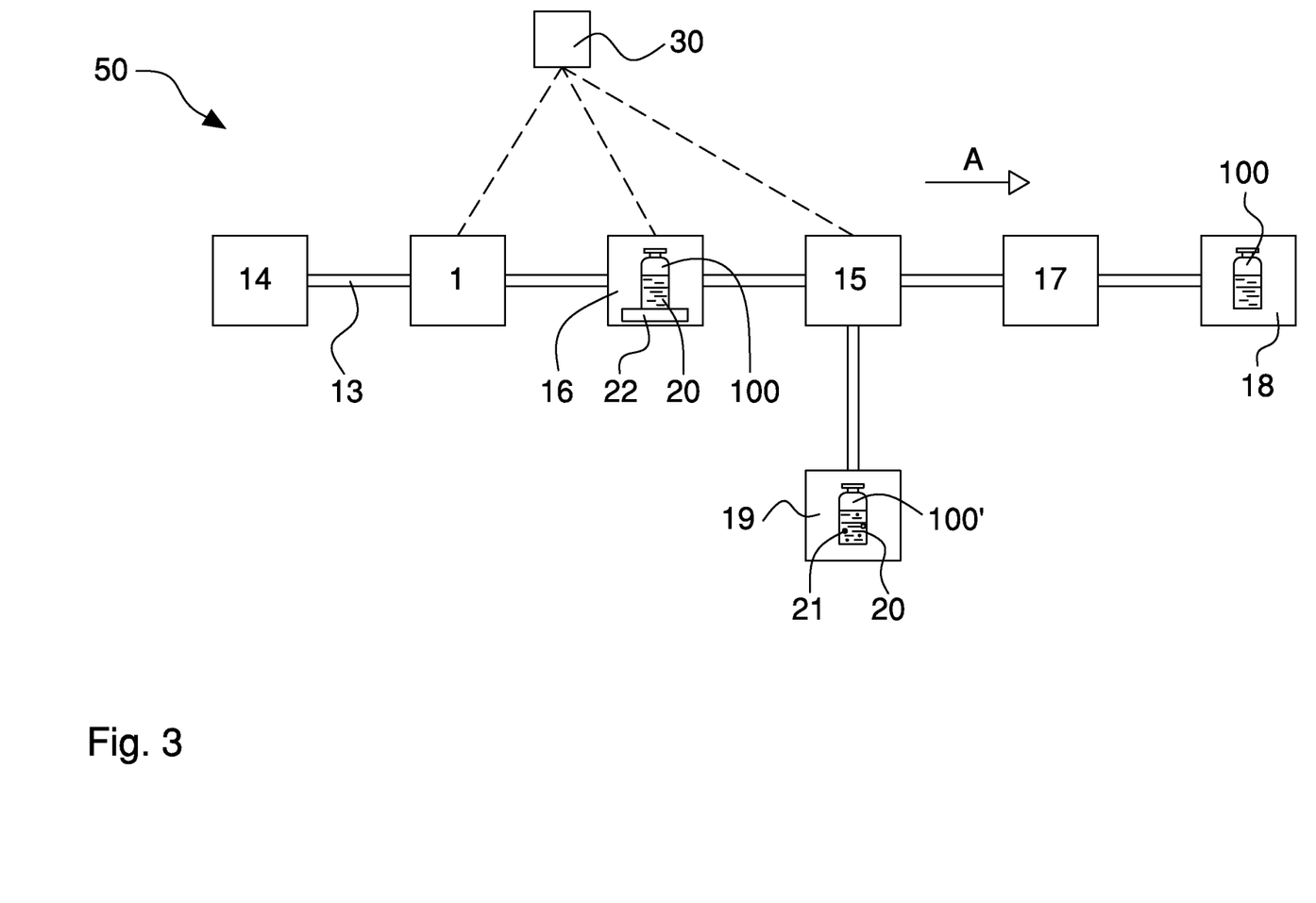
FIG. 3 is a schematic view of the filling machine of the invention.

Referring in particular to FIG. 3, the filling machine 50 according to the invention comprises, beside the above described dosing system 1 and the processing and control unit 30, at least a weighing station 16, arranged downstream of the dosing system 1 with respect to the advancement direction A and provided with at least a weight sensor 22 able to measure the weight of the containers 100 filled with the doses of products 20by the dosing system 1.

A further weighing station, not shown in Figure, may be provided upstream of the dosing system 1 to measure the empty containers 100 before they are filled with the doses of product 20. In this case, the measure of the weight of the dosed product (net weight) is calculated by subtracting the empty container (tare) from the weight of the filled container (gross weight).

The filling machine 50 includes a feeding station 14 of the empty containers 100, which are moved by the transport system 13 along an advancement direction A towards the dosing system 1.

The filling machine further comprises an output station 18 to convey out of the filling machine 50 the aforesaid containers 100 and a rejecting station 15, of known type and not shown in detail in the Figures, able to reject out-of-spec containers 100' in that they 10 have a weight measured by the weight sensor 22 out of a range of accepted weights, that is filled with irregular doses of product 20.

The processing and control unit 30, that oversees the functioning of the whole filling machine 50, is set up to receive and process a weight signal from the weight sensor 22 and a bubbles signal from the bubble sensor 10, it is connected to said dosing unit 2 and 15 set up to regulate the latter in order to modify the pre-established quantity of product supplied for each dose of product 20 as a function of a weight signal received from the weight sensor 22. In particular, the processing and control unit 30 calibrates the dosing unit 2 in such a way as to increase the volume of product of each dose of product 20 in case the weight of containers 100 measured by the weight sensor 22 is lower than the 20 range of accepted weights or reduces such quantity of product in case the weight of containers 100 is higher than the range of acceptable weights.

The processing and control unit 30 is further set up to inhibit the variation of the pre-established quantity of product supplied for each dose of product 20 as a function of the weight signal received by the weight sensor 22 in case the bubble sensor 20 detects a volume of gas bubbles 21 in the doses of products 20 lower than a pre-definite reference value. In this case in fact, the weight variation of containers 100 (underdosed) is caused by the presence of gas bubbles 21 in the doses of product 20 and not by a non-functioning or alteration in the functioning of the dosing unit 2 such as to require the processing and control unit 30 to regulate it. The presence of gas bubbles 21 of limited size and volume in the product is indeed normally a temporary phenomenon which disappears during some dosing cycles of the dosing units 2.

The processing and control unit 30 is connected to the rejecting station 15 to reject the out-of-spec containers 100'.

A closing station 17 may be provided between the weighing station 16 and the output station 18 wherein the containers 100 filled with the doses of product 20 are closed (for example tightly). The closing station 17, of known type and not shown in detail, comprises, for example in the case of phials for pharmaceutical use, proper means to insert a closing cap to the container and to apply and fix a blocking seal to the latter.

The transport system 13 moves the containers 100 along the advancement direction A through the following operative stations of the filling machine 50.

The rejecting station 15 is preferably disposed adjacent and downstream of the weighing station 16.

The rejected out-of-spec containers 100' can be directed to a collecting station 19 wherein the product dosed in them can be recovered. As an alternative, out-of-spec containers 100' may be moved to a further dosing station of the filling machine or of another machine or specific apparatus wherein they are filled with the missing quantity of product.

The functioning of the filling machine 50 according to the invention provides that the bubble sensor 10, that is connected for example to the flexible pipe of the second duct 6 connecting the dosing unit 2 to the respective delivering element 5, checks and analyses the doses of product 20 flowing through the aforesaid flexible pipe so as to detect the possible presence of gas bubbles or micro-bubbles 21, with minimum sizes as small as 0.3 µl, for example already contained in the product coming from the feed tank 3 or generated during the functioning of the dosing unit 2, for instance caused by the composition of the product itself, of the operative speed, etc.

The bubble sensor 10 also measures the volume of the gas bubbles 21 in each dose of product 20 and provides such information to the processing and control unit 30 which is thus able to calculate the effective volume of the product without gas bubbles 21 of the respective dose of product 20 delivered in a corresponding container 100.

On the basis of such calculated effective volume of product, the processing and control unit 30, which knows the density of the product, can calculate the effective weight of the dose of product 20 supplied in the respective container 100. Such effective weight of the dose of product 20 in each container 100—calculated on the basis of the measuring of the gas bubbles 21 carried out by the bubble sensor 10—can be compared by the processing and control unit 30 to the weight of the aforesaid container 100 measured by the weight sensor 22 of the weighing station 16. Such comparison may allow to control the correct functioning of the bubble sensor 10 and/or of the weight sensor 22.

It must be noted that in the case of liquid products, the minimum volume of 0.3 µl of the gas bubbles 21 detectable by the bubble sensor 10 corresponds to a weight of about 0.3 µg (with a specific volume of the liquid equal to about 1 cm$^3$/g). The bubble sensor 10 therefore has a reading resolution equal to 0.3 µg, much lower than the measuring resolution and precision of electronic scales usually employed to weight vials until 5 grams in the pharmaceutical packaging. The nominal precision of these electronic scales is typically of 1-2 µg, however, due to internal ambient conditions of the filling machine during its functioning (perturbations and interferences of various kinds caused by vibrations, flows, currents and air turbulences, etc.) such precision falls to about 10-12 µg, that is two orders of magnitude lower with respect to the resolution of 0.3 µg of the bubble sensor 10.

While functioning the weighing station 16 measures through the weight sensor 22 the weight of the containers 100 filled by the dosing system 1. When the weight sensor 22 detects out-of-spec containers 100' which have a weight out of a range of accepted weights, the processing and control unit 30 provides to regulate the dosing unit 2 so as to modify the pre-established quantity of supplied product for each dose of product 20 according to the weight signal received by the sensor weight 22, that is according to the difference between the measured weight and the range of accepted weights (underdosing or overdosing). However, such regulation of the dosing unit 2 and subsequent variation of the pre-established quantity of product supplied for each dose of product 20 is inhibited in case the bubble sensor 20 detects a volume of gas bubbles 21 in the doses of products 20 that is lower than a pre-definite reference value.

Figure 4:
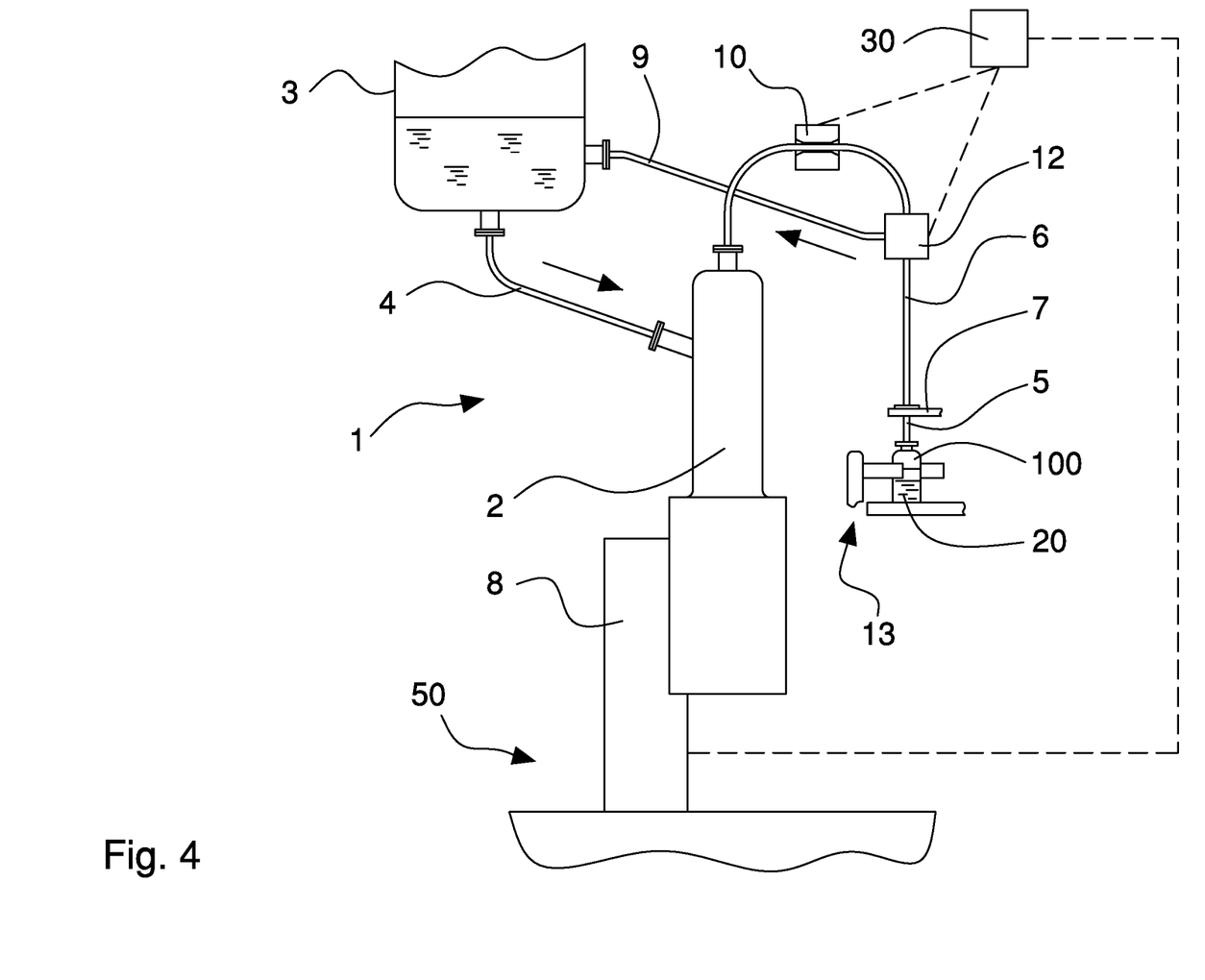
FIG. 4 is a schematic view of a variant of the filling machine of the invention.

Referring to FIG. 4, a variant of the filling machine 50 of the invention is shown, that differs from the above described embodiment shown in the FIGS. 1 to 3 for the dosing system 1 that comprises valve assembly 12 inserted in the second duct 6 and connecting the flow with the feed tank 3 by means of a third duct 9. In particular, the valve assembly 12 is interposed between the bubble sensor 10 and the delivery element 5.

The valve assembly 12 is connected to the processing and control unit 30 and driven by the latter so as to deviate and convey the doses of product 20 exiting from the dosing unit 2 towards the feed tank 3, instead of towards the delivery element 5 in case the bubble sensor 20 detects a volume of gas bubbles 21 equal or higher than a predefined reference value in the doses of product 20.

In this case, the presence of a high number of gas bubbles 21, apart from determining relevant weight variations of the containers 100 (underdosing) which would lead to reject several dosed containers, indicates a temporary phenomenon within the product and destined to disappear over time by re-circulating the product until gas bubbles 21 disappear or reduce their volume (per dose of product) below the pre-defined reference value.

Thanks to the dosing system 1 of the filling machine 50 of the invention it is thus possible to inhibit the filling of containers 100 preventing the production of out-of-spec containers 100' during the time necessary for the gas bubbles 21 to disappear or reduce their volume in the doses of product 20.

When the bubble sensor 20 does no longer detect the presence of gas bubbles 21 in the doses of product 20 or detects a volume of gas bubbles 21 that is lower than the predefined reference value, the processing and control unit 30 can activate the valve assembly 12 so as to deviate and convey the doses of product 20 exiting from the dosing unit 2 towards the delivery element 5 to restart the filling of the containers 100 with the doses of product 20.

The method of the invention for dosing a product in liquid form, in particular a pharmaceutical product, in containers (100) comprises:
  transferring by means of a dosing unit 2 doses of product 20 out of a feed tank 3 to the containers 100, each dose comprising a pre-established dose of product;
  during said transferring, checking by means of a bubble sensor 10 the doses of product 20 which flow from said feed tank 3 through the dosing unit 2 into the containers 100 for detecting the presence of gas bubbles 21 and measuring a volume of said gas bubbles 21 in each dose of product 20;
  delivering the doses of product 20 in the containers 100;
  measuring in a weighing station 16 by means of a weight sensor 22 a weight of the doses of product (20) dosed in the containers (100);
  arranging a processing and control unit 30 set up for receiving and processing a weight signal from said weight sensor 22 and a bubbles signal from the bubble sensor 10, said processing and control unit 30 being connected to said dosing unit 2 and set up so as to modify said pre-established quantity of product supplied for each product dose 20 as a function of the weight signal received by the weight sensor 22, the processing and control unit 30 being further set up to inhibit said modifying said pre-established quantity of product supplied for each product dose 20 as a function of the weight signal received by the weight sensor 22 in case the bubble sensor 20 detects in a volume of gas bubbles 21 lower than a pre-established reference value in the products doses 20.

Advantageously, the method of the invention may use the filling machine 50 and the dosing system 1 above described and shown in Figures from 1 to 3.

The method further provides rejecting out-of-spec containers 100' in that they have a weight measured by the weight sensor 22 out of a range of accepted weights. In particular, the method provides checking the doses of product 20 by means of the bubble sensor 10 when they flow in a first duct 4, entering the dosing unit 2, or in a second duct 6, exiting from the dosing unit 2, which feeds a delivery element 5 of the doses of product 20 in the containers 100.

The method further provides measuring by means of the sensor means 10 a volume of each of said gas bubbles 21 detected in the doses of product 20 and calculating on the basis of said volume of gas bubbles 21 contained in a respective dose of product 20 an effective volume of product without gas bubbles 21 of the respective dose of product 20.

The method of the invention also provides deviating and conveying towards the feed tank 3 the doses of product 20 transferred by the dosing unit 2 in order not to deliver into containers 100 the aforesaid doses of product 20 containing gas bubbles 21 in case the bubble sensor 20 detects a volume of gas bubbles 21 into the doses of product 20 equal to or higher than a predefined reference value.

Thanks to the method and the filling machine of the invention it is therefore possible to detect in the out-of-spec containers 100' (underdosed), detected by the weight sensor 22 of the weighing station 16, the possible presence of gas bubbles 21 and measure their volume so as to enable the processing and control unit 30 to determine whether to regulate or calibrate the dosing unit 2 in order to modify the pre-established quantity of supplied product for each dose of product 20 to still have compliant containers or inhibit such regulation of the dosing unit 2.

In case the bubble sensor 20 detects in the doses of product 20 a volume of gas bubbles 21 lower than a predefined reference value, the variation of the weight of the containers 100 is due to the presence of gas bubbles 21 and not to a non-functioning or alteration in the functioning of the dosing unit 2 such as to require the processing and control unit 30 to regulate it. The presence of gas bubbles 21 of limited size and volume in the product indeed is normally a temporary phenomenon which disappears during some dosing cycles of the dosing units 2. By implementing a first regulation of the dosing unit 2 as soon as gas bubbles 21 appear, the processing and control unit 30 should in fact implement a second regulation of the dosing unit 2 when gas bubbles 21 subsequently disappear thus determining an increase on the out-of-spec containers 100' produced. The method and the filling machine of the invention thus allow to optimise the performances of the filling process carried out, in particular minimizing the number of out-of-spec containers 100' to be rejected during the production.

Optimizing the filling process is furthermore made possible by re-circulating the product, that is by inhibiting the filling of the containers 100 by conveying the doses of product 20 exiting from the dosing unit 2 towards the feed tank 3 when the bubble sensor 20 detects a volume of gas bubbles 21 in the doses of product 20 equal to or higher than the predefined reference value.

In this case, in fact, the presence of a high number of gas bubbles 21, indicates a temporary phenomenon generated within the product and destined to disappear over time by re-circulating the product until gas bubbles 21 disappear or their volume (by dose of product) reduces below the pre-defined reference value.

It is thus possible to inhibit the filling of containers 100 preventing the production of out-of-spec containers 100' during the time necessary for the gas bubbles 21 to disappear or their volume to reduce in the doses of product 21.

Thanks to the method and the filling machine of the invention, it is possible to check in a precise and accurate way the weight of all the containers 100 filled with doses of product 20, also verifying, thanks to the bubble sensor 10, they do not contain air, gas or foam bubbles or micro-bubbles.

In fact the bubble sensor 10 of the ultrasound type allows to analyse in a quick and precise way the whole product flowing in the ducts before it is dosed, so as to detect out-of-spec containers 100', detected by the following weighing station 16.

The ultrasound sensor 10 allows to have information on the quality and performances of the dosing process, in order to enable the processing and control unit 30 to regulate or not to regulate the dosing unit 2 for modifying the pre-established quantity of supplied product for each dose of product 20.

Thanks to the features of the bubble sensor 10 able to measure the volume of gas bubbles 21 contained in a respective dose of product 20 delivered in a corresponding container 100, it is possible to calculate the effective volume of product without gas bubbles 21 of the dose of product 20 and, since the density of the product is known, to calculate the effective weight of the dose of product 20 delivered in the respective container 100. Such effective weight that is calculated by the control and processing unit 30 by means of the bubble sensor 10 may be compared to the weight of the aforesaid container 100 measured by the weight sensor 22 of the weighing station 16 in order to supervise the correct functioning of the bubble sensor 10 and/or of the weight sensor 22.

It should be noted that the ultrasound sensors, apart from being particularly small and cheap, are not at all influenced by perturbations and interferences due to vibrations, accelerations, stresses, flows, currents and/or air turbulences produced by the filling machine mechanisms and/or operating means and thus provide precise and reliable information on the presence of possible gas bubbles 21 in the doses of product 20 and on their volume.

Since the bubble sensor 10 may have an external structure (containing casing) that is washable and/or sterilizable and/or suitable to be used in a sterile chamber, the filling machine 50 of the invention may be provided with a containing booth that is closed and isolated from the external environment.

A variant of the method of the invention for dosing a product in liquid form, in particular a pharmaceutical product, in containers (100) comprises:
transferring by means of a dosing unit (2) doses of product (20) out of a feed tank (3) to the containers (100), each dose of product (20) comprising a pre-established quantity of product;
during said transferring, checking by means of a bubble sensor (10) the doses of product (20) which flow from the feed tank (3) through the dosing unit (2) up to the containers (100) for detecting the presence of gas bubbles (21) and measuring a volume of the gas bubbles (21) in each dose of product (20);
performing one of the two following steps:

delivering the doses of product (20) in containers (100) in case the bubble sensor (20) detects a volume of gas bubbles (21) transferred from the dosing unit (2) lower than a predefined reference value, or deviating and conveying towards the feed tank (3) the doses of product (20) transferred from the dosing unit (2) in case the bubble sensor (20) detects a volume of gas bubbles (21) in said doses of products (20) equal to, or higher than said predefined reference value.

Advantageously, the method of the invention can use the filling machine and the dosing system 1 above described and shown in Figures from 1 to 3.

The method further comprises measuring in a weighing station 16 by means of a weight sensor 22 a weight of the doses of product 20 dosed in containers 100; arranging a processing and control unit 30 set up for receiving and processing a weight signal from the weight sensor 22 and a bubbles signal from said bubble sensor 10, the processing and control unit 30 being connected to the dosing unit 2 and set up so as to modify the pre-established quantity of product supplied for each product dose 20 as a function of the weight signal received by the weight sensor 22, the processing and control unit 30 being further set up to inhibit said modifying said pre-established quantity of product supplied for each product dose 20 as a function of the weight signal received by the weight sensor 22, in case said bubble sensor 20 detects in a volume of gas bubbles 21 in said doses of product 20 lower than said pre-established reference value.

The invention claimed is:

1. A method for dosing a product in liquid form in containers, comprising:
transferring doses of product from a feed tank to said containers by means of a dosing unit, wherein each dose comprises a pre-established quantity of product;
during said transferring, checking by means of a bubble sensor said doses of product which flow from said feed tank through said dosing unit to said containers for detecting the presence of gas bubbles and measuring a volume of said gas bubbles in each dose of product;
delivering said doses of product in said containers;
measuring in a weighing station by means of a weight sensor a weight of said doses of product dosed in said containers;
arranging a processing and control unit set up for receiving and processing a weight signal from said weight sensor and a bubbles signal from said bubble sensor, wherein said processing and control unit is connected to said dosing unit and set up so as to modify said pre-established quantity of product supplied for each product dose as a function of the weight signal received by the weight sensor, and said processing and control unit is further set up to inhibit said modifying said pre-established quantity of product supplied for each product dose as a function of the weight signal received by the weight sensor, in case said bubble sensor detects in said products doses a volume of gas bubbles lower than a pre-established reference value.

2. The method according to claim 1, further comprising rejecting out-of-spec containers because having a weight measured by said weight sensor out of a range of accepted weights.

3. The method according to claim 1, wherein said checking comprises checking said doses of product that flow inside a first duct and enter said dosing unit, or that flow inside a second duct and exiting from said dosing unit to feed a delivery element of said doses of product in said containers.

4. The method according to claim 1, further comprising measuring through said bubble sensor a volume of each of said detected gas bubbles.

5. The method according to claim 4, further comprising calculating an effective volume of product without gas bubbles of a respective dose of product on the basis of said volume of gas bubbles which is contained in said respective dose of product and measured by said bubble sensor.

6. The method according to claim 1, further comprising deviating and conveying towards said feed tank said doses of product transferred from said dosing unit, in order not to dispense into said containers said doses of product that contain gas bubbles in case said bubble sensor detects a volume of gas bubbles in said doses of product equal to or higher than said predefined reference value.

7. A method for dosing a product in liquid form in containers, comprising:
   transferring doses of product from a feed tank to said containers by means of a dosing unit each dose of product comprising a pre-established quantity of product;
   during said transferring, checking by means of a bubble sensor said doses of product that flowing from said feed tank through said dosing unit up to said containers for detecting the presence of gas bubbles and measuring a volume of said gas bubbles in each dose of product;
   performing one of the two following steps:
      delivering said doses of product in said containers in case said bubble sensor detects a volume of gas bubbles transferred from said dosing unit lower than a predefined reference value, or
      deviating and conveying towards said feed tank said doses of product transferred from the dosing unit in case said bubble sensor detects a volume of gas bubbles in said doses of product equal to, or higher than said predefined reference value.

8. The method according to claim 7, further comprising:
   measuring in a weighing station through a weight sensor a weight of said doses of product dosed in said containers;
   arranging a processing and control unit set up for receiving and processing a weight signal from said weight sensor and a bubbles signal from said bubble sensor, wherein said processing and control unit being is connected to said dosing unit and set up so as to modify said pre-established quantity of product supplied for each product dose as a function of the weight signal received by the weight sensor, wherein said processing and control unit is further set up to inhibit said modifying said pre-established quantity of product supplied for each product dose as a function of the weight signal received by the weight sensor, in case said bubble sensor detects in said products doses a volume of gas bubbles lower than a pre-established reference value.

9. The method according to claim 8, further comprising rejecting out-of-spec containers, wherein said out-of-spec containers have a weight measured by said weight sensor out of a range of accepted weights.

10. The method according to claim 7, wherein said checking comprises checking said doses of product that flow inside a first duct and enter said dosing unit, or that flow inside a second duct and exiting from said dosing unit to feed a delivery element of said doses of product in said containers.

11. The method according to claim 7, further comprising measuring through said bubble sensor a volume of each of said detected gas bubbles.

12. The method according to claim 11, further comprising calculating an effective volume of product without gas bubbles of said respective dose of product on the basis of said volume of gas bubbles which is contained in a respective dose of product and measured by said bubble sensor.

13. A filling machine for dosing a product in liquid form in containers comprising a dosing system that includes:
   a dosing unit for delivering a dose of product, wherein each dose comprises a pre-established quantity of product;
   a feed tank for feeding with said doses of product said dosing unit by means of a first duct;
   at least one delivery element connected to said dosing unit by means of a second duct to release said doses of product in said containers,
   a bubble sensor associated to any one between said first duct and said second duct and arranged to detect the presence of gas bubbles in said doses of product which flow in said ducts, wherein the bubble sensor measure a volume of said gas bubbles in each dose of product;
   said filling machine further comprising:
   a weighing station provided with a weight sensor to measure a weight of said containers filled with said dosing system and to detect out-of-spec containers, wherein said out-of-spec containers have a weight out of a range of accepted weights;
   a processing and control unit set up for receiving and processing a weight signal from said weight sensor and a bubbles signal from said bubble sensor, wherein said processing and control unit is connected to said dosing unit and set up so as to modify said pre-established quantity of product supplied for each product dose as a function of the weight signal received by the weight sensor, and said processing and control unit is further set up to inhibit said modifying said pre-established quantity of product supplied for each product dose as a function of the weight signal received by the weight sensor, in case said bubble sensor detects in said products doses a volume of gas bubbles lower than a pre-established reference value.

14. The machine according to claim 13, wherein said bubble sensor comprises an ultrasound sensor arranged to detect gas bubbles in the doses of product and to measure a volume of said gas bubbles.

15. The machine according to claim 13, wherein said first duct and/or said second duct comprise respective flexible pipes made of plastic material.

16. The machine according to claim 13, further comprising a plurality of dosing units and a plurality of bubble sensors, wherein each of the bubble sensors is associated to a respective dosing unit.

17. The machine according to claim 13, wherein said dosing unit comprises one between piston pump, rotary pump, peristaltic pump, flow meter dosing apparatus, time/pressure dosing apparatus.

18. The machine according to claim 13, wherein said bubble sensor is washable and/or sterilizable and/or suitable for use in a sterile chamber.

19. The machine according to claim 13, wherein said dosing system comprises a valve assembly inserted in said second duct and connected to the flow with said feed tank by means of a third duct, and said valve assembly is connected to and driven by said processing and control unit so as to deviate and convey said doses of product that exit from said dosing unit towards said feed tank in case said bubble sensor detects in said doses of product a volume of gas bubbles equal or higher than said predefined reference value.

20. The machine according to claim 13, further comprising a rejection station to reject said out-of-spec containers.

21. The machine according to claim 13, further comprising a closing station to close said containers filled with said dose of product.

22. The machine according to claim 20, wherein said rejection station is arranged downstream of said dosing system with reference to an advancement direction of said containers through said filling machine.

23. The machine according to claim 13, further comprising an output station to outwardly convey from said filling machine said containers.

* * * * *